Oct. 15, 1929.  W. A. MATHESON  1,731,312
CASTER
Filed Aug. 8, 1927   2 Sheets-Sheet 1
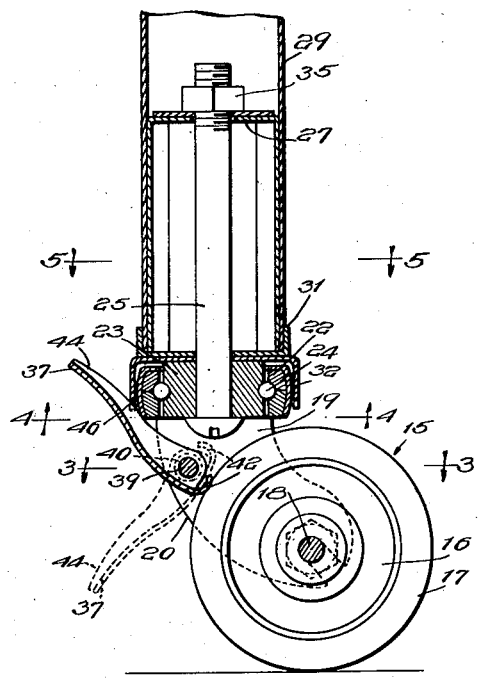
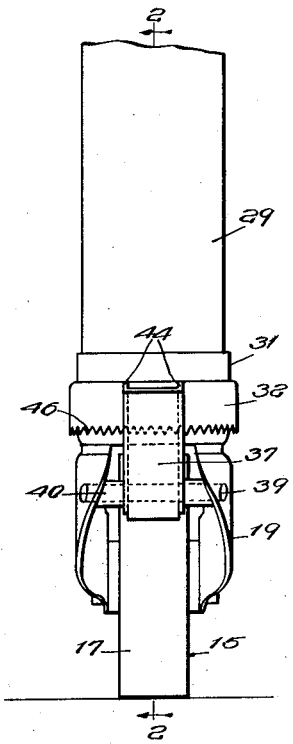
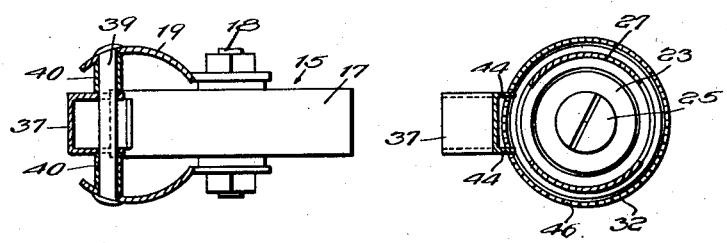
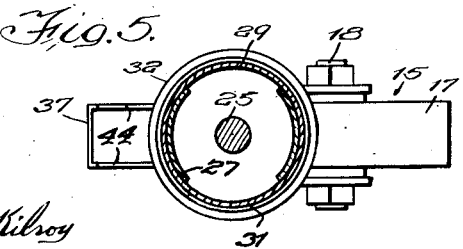
Witness:
William P. Kilroy
Inventor:
William A. Matheson
Hill & Hill
Attys Oct. 15, 1929.   W. A. MATHESON   1,731,312
CASTER
Filed Aug. 8, 1927   2 Sheets-Sheet 2

Witness:
William P. Kilroy

Inventor:
William A. Matheson
By Hill & Hill
Attys

Patented Oct. 15, 1929

1,731,312

UNITED STATES PATENT OFFICE

WILLIAM A. MATHESON, OF CHICAGO, ILLINOIS, ASSIGNOR TO ROLL-A-WAY CORPORATION, OF CHICAGO, ILLINOIS, A CORPORATION OF ILLINOIS

CASTER

Application filed August 8, 1927. Serial No. 211,442.

My invention relates broadly to casters and more particularly to casters having means associated therewith for preventing rotation of the wheels thereof and for preventing relative motion between the casters and the objects supported thereby.

The invention has among its other objects the production of devices of the kind described which are compact, convenient, durable, efficient and satisfactory for use wherever found applicable.

A particular object of the invention is to provide improved brake mechanism upon a caster for preventing rotation of the wheel thereof.

Another particular object of the invention is to provide improved means mounted on the caster for preventing relative movement between the caster and the articles supported thereby.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is an elevation of a caster having brake mechanism which embodies the invention, the caster being shown in connection with a leg of a device supported thereby;

Fig. 2 is a section taken on line 2—2 of Fig. 1;

Fig. 3 is a section taken on line 3—3 of Fig. 2;

Fig. 4 is a section taken on line 4—4 of Fig. 2;

Fig. 5 is a section taken on line 5—5 of Fig. 2;

Figure 10:
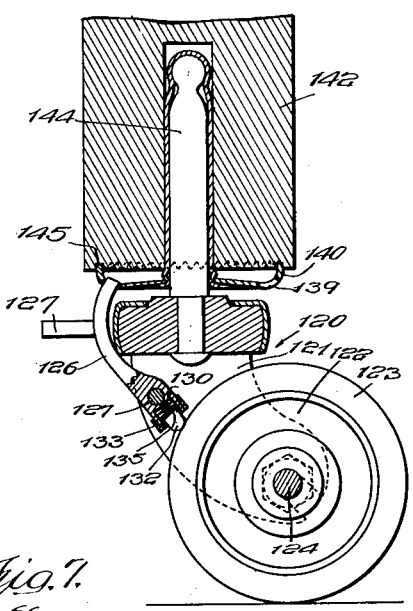
Figure 9:
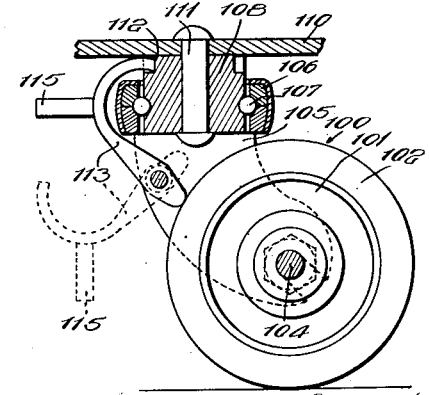

Fig. 9 is a central vertical section taken through a caster having brake mechanism which embodies still another form of the invention, the caster being shown in connection with a portion of a device supported thereby; and Fig. 10 is a central vertical section taken through a caster embodying still another form of the invention, the caster being shown in connection with the leg of an object supported thereby.

Referring for the present to Figs. 1 to 5, inclusive, the reference character 15 designates generally a caster which preferably comprises a wheel 16 provided with a rubber tire 17. The wheel 16 is rotatably journaled by means comprising a bolt 18, or the equivalent, which is mounted in bifurcations 19 formed in a bifurcated member or frame 20. In this instance, the frame 20 is formed from sheet metal and the outer race 22 of a ball bearing 24 is carried thereby, the inner race 23 of the ball bearing being mounted upon a bolt 25 whereby the caster 15 is secured to a bushing-like member 27. The bushing-like member 27 is positioned in the lower end of a hollow leg 29 which is part of the article or device supported by the caster. Thus, the leg 29 may be part of a washing machine, a table, a chair, a bed, or any other article of this character. The lower end of the leg 29 is preferably closed by a cap 31 and a cup-shaped washer 32 is preferably clamped between the inner race 23 and the cap 31 so that it can not be rotated upon the bolt 25 which passes through it. It will be noted that the cap 31 is also apertured to accommodate the bolt 25. A nut 35 screw-threaded upon the upper end of the bolt 25 cooperates with the bolt to secure the caster to the leg 29.

It is readily understood that the wheel 16 has an axis of rotation coincident with the longitudinal axis of the bolt 18 and that the frame 20 and the wheel 16 may rotate as a unit around the longitudinal axis of the bolt 25. This construction permits the article supported by the caster to be rolled over a floor or any suitable support so that the article may be quickly and easily moved into any desired position. It is also readily understood that at times it is desirable to have the article which is supported by the caster remain in a predetermined position. Of course, when the article is placed in a predetermined position and someone comes in contact with it, the caster permits the article to be displaced very readily unless means is provided for preventing the caster from functioning in a normal manner. In the improved device shown in Figs. 1 to 5, inclusive, I provide means whereby the wheel 16 may be held against rotation around its axis of rotation and whereby the frame 20 may be held against rotation around the longitudinal axis of the bolt 25. This means preferably comprises a lever 37 which is stamped from sheet metal and is preferably pivoted upon a pin 39 carried by the bifurcations 19. As best shown in Fig. 3, the lever 37 is preferably U-shaped in cross section and is aligned by spacing sleeves 40 with the wheel 16. The lever 37 terminates at one end in an integral resilient finger 42 which may be brought into engagement with the tire 17 to prevent rotation of the wheel 16. The other end of the lever 37 is preferably of such length that it may be engaged by one's foot and moved into the position wherein it is shown in full lines in Fig. 2 or into the position wherein it is shown in dotted lines in the same figure. Of course, when the lever 37 is moved into the position wherein it is shown in dotted lines in Fig. 2, the finger 42 does not engage the tire 17 and does not prevent rotation of the wheel 16.

When the lever 37 is in the position wherein it is shown in full lines in Fig. 2, flanges 44 formed integral therewith engage detents or notches 46 formed in the cup-shaped member 32 so that the frame 20 and the wheel 16 can not rotate as a unit around the longitudinal axis of the bolt 25. Obviously, when the article is supported by a plurality of casters having braking means of the kind shown in Figs. 1 to 5, inclusive, and this braking means is adjusted to prevent normal functioning of the casters, the article will not tend to roll around the floor when someone comes in contact with it.

Figure 6:
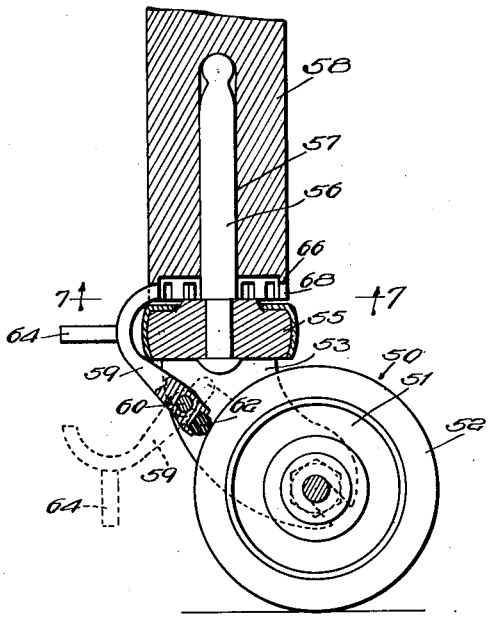
Fig. 6 is a vertical section taken through a caster having brake mechanism which embodies another form of the invention, the caster being shown in connection with a leg of a device supported by the caster.
Figure 7:
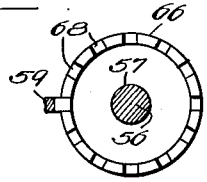
Fig. 7 is a section taken on line 7—7 of Fig. 6.

Figs. 6 and 7 illustrate another form of the invention embodied in a caster 50 which preferably comprises a wheel 51 having a rubber tire 52, the wheel being mounted in a bifurcated member or frame 53. The wheel 51 is rotatably journaled by means which is carried by the bifurcations of the frame 53. Rigidly secured to the frame 53 is a hub 55 which is carried by one end of a pin 56 adapted to be inserted in a recess 57 formed in a leg 58, the leg 58 being part of the article supported by the caster. A lever 59 is pivoted upon a pin 60 which is mounted in the frame 53, one end of the lever 59 being provided with a tip or an insert 62 which is preferably formed of rubber and is engageable with the rubber tire 52. The other end of the lever 59 is provided with an outwardly extending lug 64 whereby the lever may be engaged by one's foot and brought in either one of the positions wherein it is shown in Fig. 6. Thus, it may be brought into the full line position so that the rubber tip 62 will engage the tire 52 and prevent rotation of the wheel 51. When the lever 59 is in this position, it engages the leg 58 in such manner that it prevents rotation of the wheel 51 and the frame 53 as a unit around the longitudinal axis of the pin 56. For this purpose, I have provided a downwardly extending flange 66 upon the leg 58, which flange 66 is provided with notches 68 engageable by the lever 59.

Figure 8:
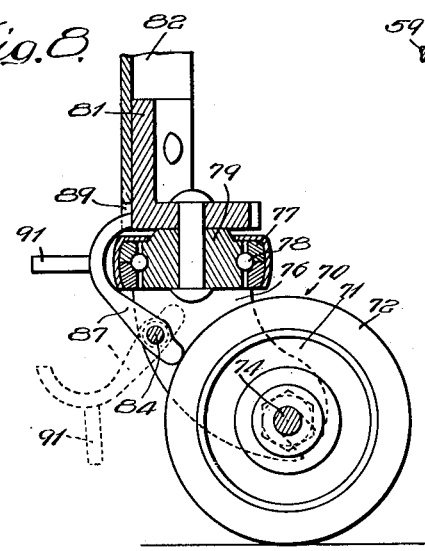
Fig. 8 is a central section taken through a caster having brake mechanism which embodies another form of the invention, the caster being shown in connection with a leg of a device supported by the caster.

In Fig. 8, I have shown still another form of the invention embodied in a caster 70 which preferably comprises a wheel 71 having a rubber tire 72, or the equivalent, means comprising a bolt 74 being provided to rotatably journal the wheel 71 in a bifurcated frame 76 which carries the outer race 77 of a ball bearing 78. The inner race 79 of the ball bearing 78 is rigidly secured to a bracket member 81 which is fixed to the lower end of a leg 82, the leg 82 being part of the article supported by the caster. A pin 84 mounted in the frame 76 pivots a lever 87 which, when it is in the position wherein it is shown in full lines in Fig. 8, engages the rubber tire 72 and prevents rotation of the wheel 71 around the longitudinal axis of the bolt 74. One end of the lever 87 is engageable with notches 89 formed in the bracket member 81 and it is readily understood that when one of the notches 89 is so engaged by the lever 87, the wheel 71 and frame 76 are held against rotation as a unit around the axis of rotation of the ball bearing 78. The lever 87 is preferably provided with an outstanding lug 91 whereby one's foot may be employed to bring the lever into either one of the positions wherein it is shown in Fig. 8.

Referring now to Fig. 9, the reference character 100 designates a caster which embodies another form of the invention. The caster 100 preferably comprises a wheel 101 provided with a rubber tire 102. Means comprising a bolt 104 is preferably provided for rotatably journaling the wheel 101 in a bifurcated frame 105 which carries the outer race 106 of a ball bearing 107 which has its inner race 108 rigidly secured to a member 110, a rivet 111 being provided for this purpose. It will be noted that the inner race 108 is provided with a plurality of notches 112 engageable by one end of a lever 113 which has its other end designed to engage the rubber tire 102 when the lever is in the position wherein it is shown in full lines in Fig. 9. An outwardly extending lug 115 provided upon the lever 113 provides means whereby one's foot may be employed to bring the lever into either one of the positions wherein it is shown in Fig. 9. Of course, when the lever 113 is in the position wherein it is shown in full lines, the lever 113 prevents rotation of the wheel 101 around the longitudinal axis of the bolt 104 and also prevents rotation of the wheel 101 and the frame 105 as a unit around the axis of rotation of the roller bearing 107.

In Fig. 10, I have shown still another form of the invention embodied in a caster 120 which preferably comprises a bifurcated frame member 121 and a wheel 122, the wheel 122 being preferably provided with a rubber tire 123. Means including a bolt 124 is provided for rotatably journaling the wheel 122 in the frame 121 and a brake lever 126 is pivoted by a bolt 127, the bolt 127 being mounted in the bifurcations of the frame 121. It will be noted that the lever 126 is provided with an outwardly projecting lug 128 which may be engaged by one's foot to angularly displace the lever around the bolt 127. One end of the lever 126 is preferably provided with a recess 130 in which a plunger 132 is slidably journaled, a cap 133 screw-threaded upon the lever 126 being preferably provided to prevent the plunger 132 from dropping out of the recess 130. Disposed in the recess 130 is a compression spring 135 which urges the plunger 132 away from the pivotal axis of the lever.

The other end of the lever 126 is preferably engageable with a plurality of apertures or detents 139 formed in a ferrule 140 which is preferably mounted in the lower end of a leg 142, or the equivalent, the leg 142 being part of the object which is supported by the caster. As shown, an upwardly extending pin 144 rigidly secured to the frame 120 and forming a part thereof is rotatably journaled in the ferrule 140. In the illustrated embodiment of the invention, the ferrule 140 is provided with a serrated edge 145 engageable with the leg 142 to prevent the ferrule from being angularly displaced around the longitudinal axis of the pin 144.

It is readily understood that when the lever 126 is in the position wherein it is shown in full lines in Fig. 10, the plunger 132 engages the tire 123 and prevents rotation of the wheel 122 around the longitudinal axis of the bolt 124 and the lever engages one of the apertures 139 in such manner that the wheel 122 and the frame 121 can not rotate as a unit around the longitudinal axis of the pin 144. However, if the lever 126 is angularly displaced in a counter clockwise direction (Fig. 10) the lever 126 will be disengaged from the aperture 139 and the plunger 132 will be brought into the position wherein it will not prevent rotation of the wheel 122 around the longitudinal axis of the bolt 124.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. The combination with a caster comprising a frame, means for rotatably supporting said frame, and a wheel journaled in said frame, of a lever carried by said frame and engageable with said wheel and said means for simultaneously preventing rotation of said wheel and said frame around their respective axes of rotation.

2. The combination with a caster comprising a frame, a member for rotatably journaling the frame, said member having a portion provided with detents therein, and a wheel journaled in said frame, of a lever carried by said frame and engageable simultaneously with said detents and said wheel to prevent rotation of said frame and said wheel around their respective axes.

3. The combination with a caster comprising a rotatably journaled frame, and a wheel rotatably journaled in said frame, of a device supported by said caster, and a lever engageable simultaneously with said device and said wheel for preventing rotation of said frame and said wheel around their respective axes of rotation.

4. The combination with a ferrule provided with a plurality of detents, of a caster comprising a frame journaled in said ferrule, a wheel rotatably mounted in said frame, and a lever carried by said frame and movable into a position wherein it simultaneously engages said wheel and said detents.

5. The combination with a caster comprising a rotatably journaled frame and a wheel rotatably journaled in said frame, of a device supported by said caster, and a lever engageable simultaneously with said device and with said wheel for preventing rotation of said frame and said wheel about their respective axes of rotation, said lever having a resilient tip for engaging said wheel.

6. The combination with a ferrule provided with a plurality of detents, of a caster comprising a frame journalled in said ferrule, a wheel rotatably mounted in said frame, and a substantially U-shaped lever carried by said frame and movable into a position wherein an end of said lever engages said wheel and the edges of said lever engage in said detents.

7. The combination with a ferrule provided with a plurality of detents, of a caster comprising a frame journalled in said ferrule, a wheel rotatably mounted in said frame, and a substantially U-shaped lever having a resilient tip, said lever being carried by said frame and movable into a position wherein said tip engages said wheel and the edges of said lever engage in said detents.

In witness whereof, I have hereunto signed my name.

WILLIAM A. MATHESON.